United States Patent [19]

Taiani

[11] 4,304,256

[45] Dec. 8, 1981

[54] TORQUE TRANSMITTING ASSEMBLY FOR ROTARY VALVE MEMBER

[75] Inventor: Patrick M. Taiani, Halifax, Canada

[73] Assignee: Nova Scotia Research Foundation Corporation, Nova Scotia, Canada

[21] Appl. No.: 88,932

[22] Filed: Oct. 29, 1979

[30] Foreign Application Priority Data

Nov. 21, 1978 [CA] Canada .................................. 316610

[51] Int. Cl.³ ...................... F16K 37/00; F16K 31/08
[52] U.S. Cl. ................................. 137/556.3; 251/104; 251/109; 251/286; 251/65
[58] Field of Search .................. 251/65, 284, 286, 133, 251/95, 96, 102, 103, 104, 107, 109; 137/556, 556.3; 335/288, 306

[56] References Cited

U.S. PATENT DOCUMENTS

| | | | |
|---|---|---|---|
| 1,032,649 | 7/1912 | Bierick | 251/109 |
| 1,049,662 | 1/1913 | Brown et al. | 251/109 |
| 1,217,700 | 2/1917 | Brown et al. | 251/109 |
| 2,167,321 | 7/1939 | Abercrombie | 137/556 |
| 2,289,574 | 7/1942 | Carlson | 251/65 |
| 2,346,904 | 4/1944 | Carlson | 251/65 |
| 2,589,188 | 3/1952 | DeCraene et al. | 251/65 |
| 2,644,477 | 7/1953 | King | 251/65 |
| 3,212,751 | 10/1965 | Hassa | 251/65 |
| 3,347,262 | 10/1967 | Gibson | 251/65 |
| 3,355,140 | 11/1967 | Andersen | 251/65 |
| 3,747,892 | 7/1973 | Gigantino et al. | 251/65 |
| 3,984,797 | 10/1976 | Rayburn | 335/306 |
| 4,106,825 | 8/1978 | Ruyak | 308/139 |

FOREIGN PATENT DOCUMENTS

| | | | |
|---|---|---|---|
| 868723 | 4/1971 | Canada . | |
| 1091084 | 4/1955 | France | 335/306 |
| 642353 | 8/1950 | United Kingdom | 335/306 |
| 697051 | 9/1953 | United Kingdom | 335/306 |

Primary Examiner—Martin P. Schwadron
Assistant Examiner—George L. Walton
Attorney, Agent, or Firm—Roylance, Abrams, Berdo & Farley

[57] ABSTRACT

A torque transmitting assembly for effecting rotation of a valve member such as a butterfly valve is hermetically sealed to the valve housing. It includes a rotor member having a plurality of circumferentially spaced permanent magnets of opposite polarity and a driver magnet assembly having a like plurality of circumferentially spaced permanent magnets of opposite polarity facing the magnets mounted to the rotor. The two sets of magnets are separated by a stainless steel separator which hermetically seals the rotor. The driver magnet assembly is rotatable about the separator so that magnetic coupling forces effect a following rotation of the rotor and hence of the valve member. A magnetic indicator may be used to identify the rotational position of the rotor. The entire assembly is hermetically sealed and no packing is required. The assembly is especially useful to control a valve in a hazardous environment wherein no leakage of the fluid being controlled by the valve member is permissible.

25 Claims, 13 Drawing Figures

TORQUE TRANSMITTING ASSEMBLY FOR ROTARY VALVE MEMBER

The present invention relates to valve actuators in general and to a magnetically operated, hermetically sealed, packless actuator for rotatable valves such as butterfly valves.

BACKGROUND OF THE INVENTION

Valves, such as butterfly valves, are used to control the flow of a substance such as a liquid or a gas. Often, such valves are used to control the flow of fluids which are hazardous for the reasons of toxicity, radiation or corrosion. When used in such hostile environments it is necessary to completely seal the external valve actuator to prevent any leakage of the hazardous fluid. In the past it has been common to use a packing material or other sealing material around the valve stem to prevent leakage. Such materials, with time, will wear and the chance of leakage thus increases with time. If the packing material is not replaced before the leakage becomes dangerous, a disasterous situation could develop.

SUMMARY OF THE INVENTION

The present invention aims to overcome the problems of the prior art by providing a valve actuator wherein the valve stem is hermetically sealed from the actuator portion to thereby avoid any leakage from the valve body. The invention utilizes magnetic coupling forces to transmit torque from a driver assembly to a driven assembly which in turn rotates the valve stem and the valve member.

The present invention uses two coaxial cylindrical magnet assemblies coupled together by way of a metallic barrier such that they are tightly coupled in rotation. The assembly may be mounted to a conventional valve with the inner rotor or carrier member keyed to the stem of the valve. The carrier member contains a plurality of rare earth magnets arranged with alternate polarization around its periphery. These magnets are closely coupled with a further arrangement of magnets mounted on the inner surface of a cylinder such that opposite poles align. The outer and inner magnets are isolated by a solid stainless steel barrier which is statically sealed to the valve body. Upon rotation of the outer cylinder torque is applied via the magnetic coupling to the carrier member thereby applying torque to the valve stem. The torque available from this magnetic coupling far exceeds that necessary to operate the valve under normal conditions, thus allowing a high safety factor to ensure satisfactory operation of the valve.

Since the valve is hermetically sealed by this arrangement, it becomes desirable, although not necessary, to have a visual indication of the position of the carrier member and hence of the valve member in the event of any failure or confusion on behalf of the operator. This is achieved by way of a second magnetic coupling which operates an indicator through the stainless steel barrier to thereby positively indicate the position of the valve stem.

The present invention may be broadly defined therefore as an hermetically sealed torque transmitting assembly for effecting rotation of a valve member contained within a valve body and having a valve stem extending from the body, comprising: a generally cylindrical housing defining a central axis and having a base through which the valve stem extends, a cylindrical wall portion and an end cap portion, the wall portion being rotatable about the axis; a generally cylindrical carrier member within the housing, the carrier member being connectable at one end to the valve stem and being rotatable about the axis; a first plurality of circumferentially spaced permanent magnet elements mounted in the carrier member so as to face the wall portion, circumferentially adjacent magnet elements having opposite polarity; a second plurality of circumferentially spaced permanent magnet elements mounted in the wall portion to face the magnet elements in the carrier member, circumferentially adjacent magnet elements of the second plurality being of opposite polarity; and a generally magnetically inert separator member sealed to the base so as to completely enclose the carrier member, the separator member having a wall portion positioned between the first plurality of magnet elements and the second plurality of magnet elements; whereby rotation of the housing wall portion results in magnetically induced rotation of the carrier member, and the valve stem and valve member connected thereto.

BRIEF DESCRIPTION OF THE DRAWINGS

The present invention will be described in detail with reference to the drawings wherein.

DESCRIPTION OF THE PREFERRED EMBODIMENT

Figure 1:
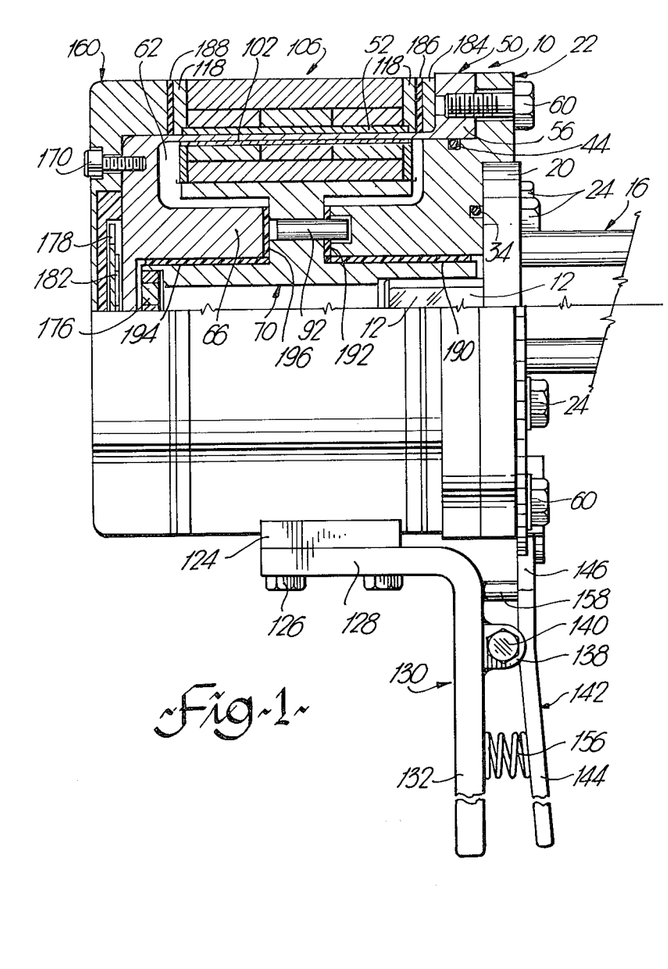
FIG. 1 is a partially cut away view of the overall assembly of the present invention.

FIG. 1 illustrates the torque transmitter 10 of the present invention in partial section, the torque transmitter being particularly useful in effecting rotation of the stem 12 of a butterfly valve (not shown). A flanged coupling 16 carries a bearing or bushing 18 which in turn supports the valve stem 12. Coupling 16 is provided at one end with a circular flange 20 through which stem 12 passes. Coupling 16, including flange 20 may be a part of the valve body containing a butterfly valve or may act as a connection between the torque transmitter and the valve body.

Figure 6:
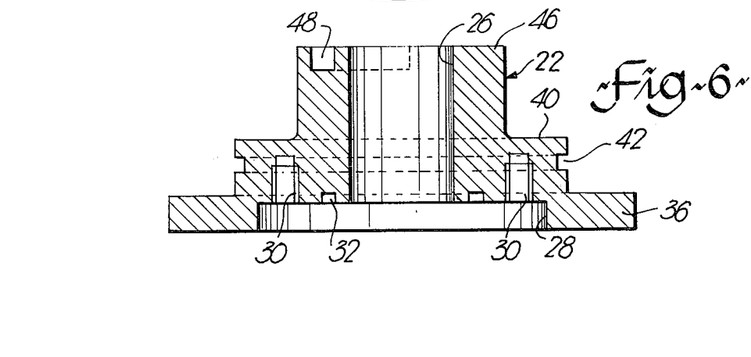
FIG. 6 is a vertical section of the base member used in the present invention taken on the line 6—6 of FIG. 7.
Figure 7:
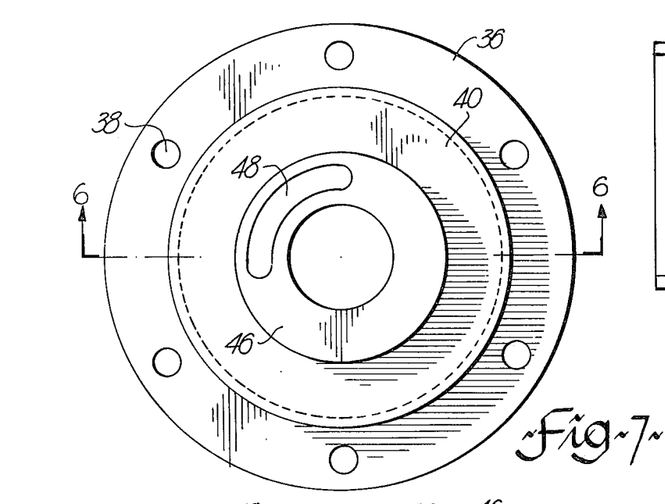
FIG. 7 is a plan view of the base member.

FIGS. 1, 6 and 7 illustrate the base 22 of the torque transmitter, which base is affixed to flange 20 as by spaced bolts 24. As shown in detail in FIGS. 6 and 7, base 22 is generally cylindrical in shape with a central axial bore 26. Bore 26 leads into a circular recess 28 which is of essentially the same diameter as flange 20 so as to receive the flange 20 therein. Threaded bores 30 are provided in the body of base 22 extending inwardly from recess 28 so as to receive the mounting bolts 24. An annular groove 32 extends inwardly into the body of base 22 from recess 28 so as to receive an O-ring seal 34 which acts to hermetically seal the base 22 to the flange 20.

Base 22 has its largest diameter at the flange portion 36 which extends outwardly from recess 28 and which may be considered to contain the recess 28. A plurality of spaced bores 38 extend through flange portion 36 as shown in FIG. 7. Base 22 has a body portion 40 of intermediate diameter axially adjacent flange portion 36, body portion 40 containing the threaded bores 30. Body portion 40 also is provided with a circumferential groove 42 which, as seen in FIG. 1, may receive an O-ring seal 44. Base 22 finally is provided with a cylindrical portion 46 extending axially outwardly from intermediate portion 40, cylindrical portion 46 having the smallest outer diameter of base 22. A groove 48 is provided in the end face of cylindrical portion 46, groove 48 extending through slightly more than 90° as shown in FIG. 7.

Base 22 is desirably machined as a unitary piece from type 316 stainless steel.

Figure 8:
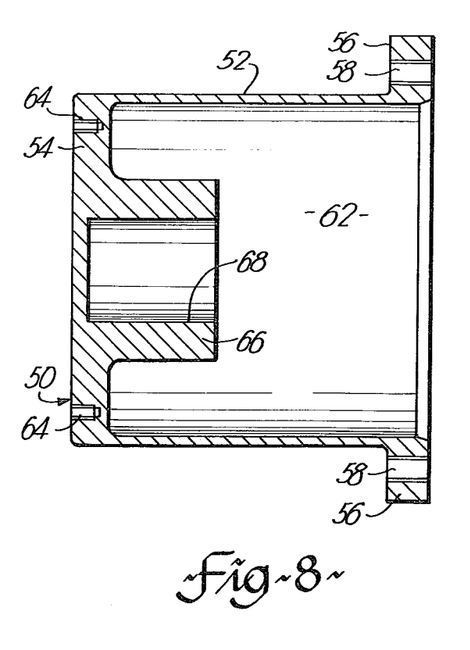
FIG. 8 is a vertical section of the separator member used in the present invention.

FIGS. 1 and 8 illustrate a separator member 50 which may also be formed from type 316 stainless steel. Separator member 50 is generally cup-shaped with a cylindrical side wall 52 and an integrally formed end wall 54. A circumferential flange 56 extends outwardly from the side wall 52 adjacent the free end thereof. Flange 56 is provided with a plurality of spaced threaded bores 58 therethrough, each bore 58 being alignable with a corresponding bore 38 in the flange portion 36 of base 22. The separator member may be affixed to base 22 as by bolts 60 extending through bores 38 and received in threaded bores 58. As seen in FIG. 1 the inner diameter of the side wall 52 corresponds to the outer diameter of base intermediate portion 40 and, when the separator member 50 is connected to the base 22, O-ring 44 will act to hermetically seal the cavity 62 formed therebetween.

Returning to FIG. 8, the end wall 54 is considerably thicker than the side wall 52. The end wall 54 is provided with a plurality of spaced threaded bores 64 extending inwardly and on its inner surface it is provided with an annular, inwardly directed boss 66 defining a blind bore 68 axially therein. Bore 66 has the same diameter as bore 26 provided in base 22 and when the separator member 50 is affixed to the base 22 the bores 66 and 26 will be coaxial.

Figures 2, 3:
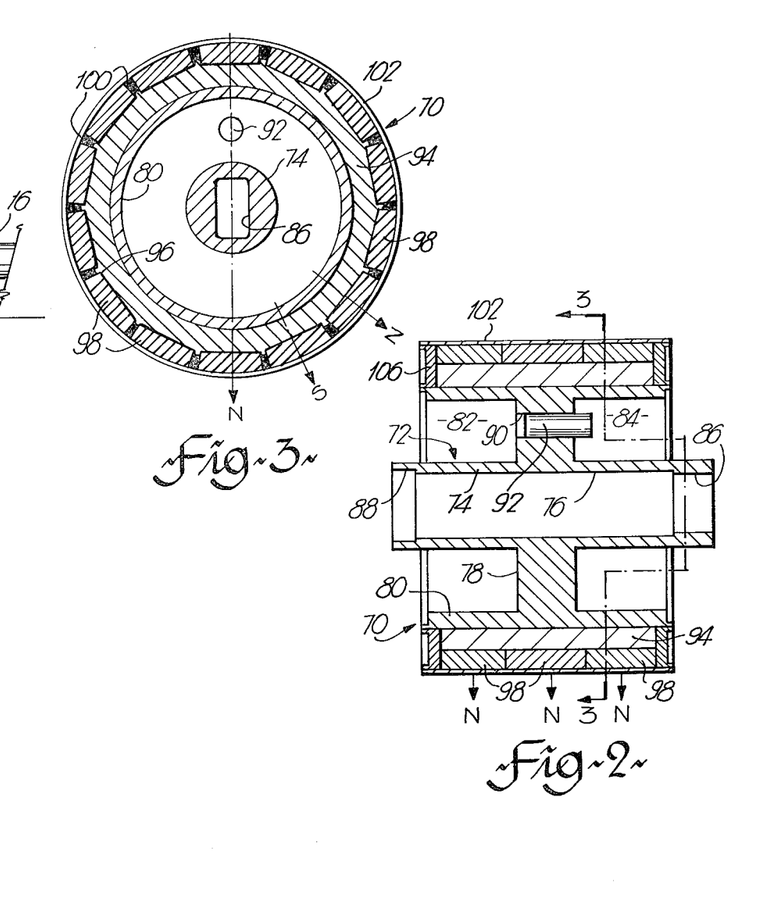
FIG. 2 is a vertical cross-section of the carrier member used in the assembly of FIG. 1.
FIG. 3 is a transverse section on the line 3—3 of FIG. 2.

FIGS. 1, 2 and 3 illustrate a carrier member 70 which is to be contained within the hermetically sealed cavity 62. Carrier member 70 includes a stainless steel central carrier 72 having an annular shaft portion 74 with a central bore 76, a radially directed annular flange portion 78, and an outer annular cylindrical wall portion 80, the shaft portion 74, flange portion 78 and wall portion 80 defining opposed annular recesses 82 and 84 in the carrier 72. Central bore 76 is provided at one end with a rectangular slot 86 sized to receive the corresponding end of the valve stem 12 so as to be keyed thereto. Other keying mechanisms as are well known in the art could be used to affix the carrier member 70 to the valve stem 12. At the other end thereof central bore 76 is provided with a recess 88 the purpose of which will be described hereinafter.

Flange 78 carries a bore 90 parallel to bore 76 with a pin 92 press fit therein so as to project slightly from flange 78 towards the end of the carrier member having the slot 86. Pin 92 is sized and positioned to have its projecting end receivable in the groove 48 provided in the end face of base 22, for a purpose to be described hereinafter.

An annular armature 94 is machined from mild steel for a shrink fit on the cylindrical portion 80 of the central carrier 72. Armature 94 has a plurality, such as fourteen, of slots 96 machined longitudinally in the outer peripheral surface thereof and each slot receives three rare-earth cobalt magnets 98 therein. The slots 96 are machined in the armature 94 after it has been shrunk fit to the central carrier 72. The magnets 98 are oriented so that the polarity is as shown in FIGS. 2 and 3. Thus all three magnets in any one slot have the same polarity but the polarity of each group of magnets alternates about the periphery of the armature.

Once the magnets have been positioned in the slots 96 all voids therebetween are filled with a curable pourable paste such as UNISET ® A-316 as at 100 and the assembly is cured as at 250° F. for 10 minutes to solidify and cure the paste. The entire assembly may then be machined to bring the outside diameter of the magnet segments to the desired size. A stainless steel sleeve 102 is slid over the magnet assembly and annular end flanges 104, 106 cap the ends of the magnets 98 and armature 94. End flanges 104, 106 are welded to the sleeve 102 and the outer cylindrical portion 80 of the central carrier to hermetically seal the magnets in place.

Figures 4, 5:
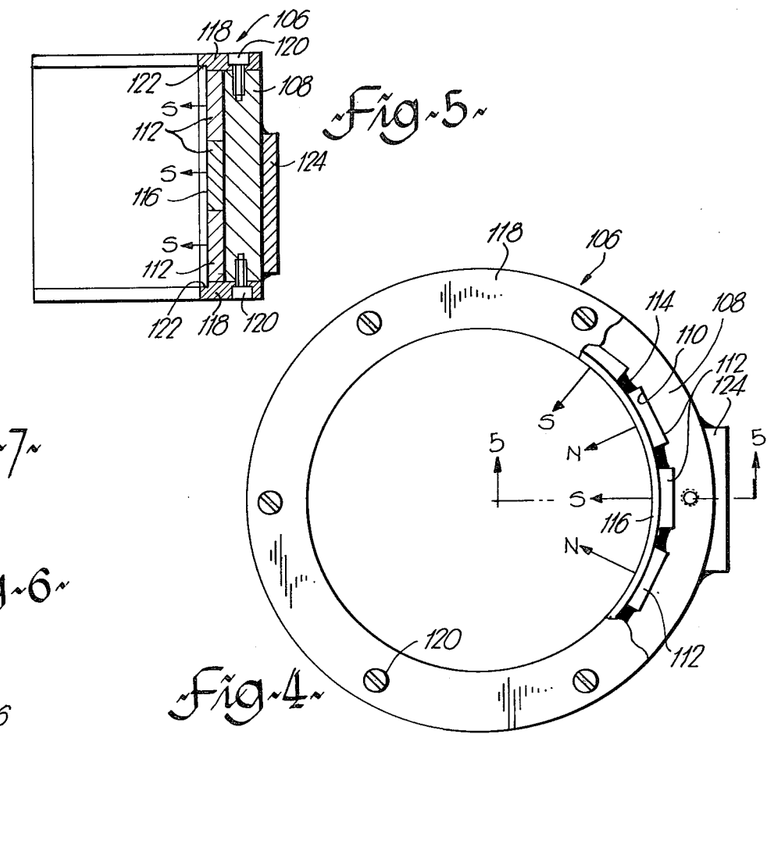
FIG. 4 is an end view, partially cut away of the driver magnet assembly.
FIG. 5 is a section on the line 5—5 of FIG. 4.

Turning now to FIGS. 1, 4 and 5 a cooperating rotatable driver magnet assembly 106 is shown. Assembly 106 is positioned outside separator member 50 as illustrated in FIG. 1 and includes a mild steel annular armature 108 having a plurality of slots 110 machined longitudinally thereof in the inner surface. The number of slots 110 will be the same as provided in the carrier armature 94, preferably fourteen. Each slot receives three rare-earth cobalt magnets 112 therein with the magnets oriented so that the polarity is as shown in FIGS. 4 and 5. Thus all three magnets in any one slot have the same polarity but the polarity of each group of magnets alternates about the inner periphery of the armature 108. As with the carrier magnet assembly all voids therebetween are filled with a curable pourable paste such as UNISET ® A-316 as at 114 and the driver magnet assembly is cured to set the paste and the inner periphery is machined to the proper inside diameter.

A sleeve 116 has a snug fit with the inner surface of the magnet assembly and at each end thereof an annular thrust ring 118 is affixed to the armature as by set screws 120. The inner edge of each thrust ring has a slight recess 122 to receive the protruding end of the inner sleeve 116 for a snug fit therewith following assembly. Sleeve 116 is formed of a steel alloy, such as AMPCOLOY ®, which is compatable as a bearing with stainless steel separator member 50 so that there will be no galling when the driver magnet assembly rotates relative to the separator member.

Figures 9, 10, 13:
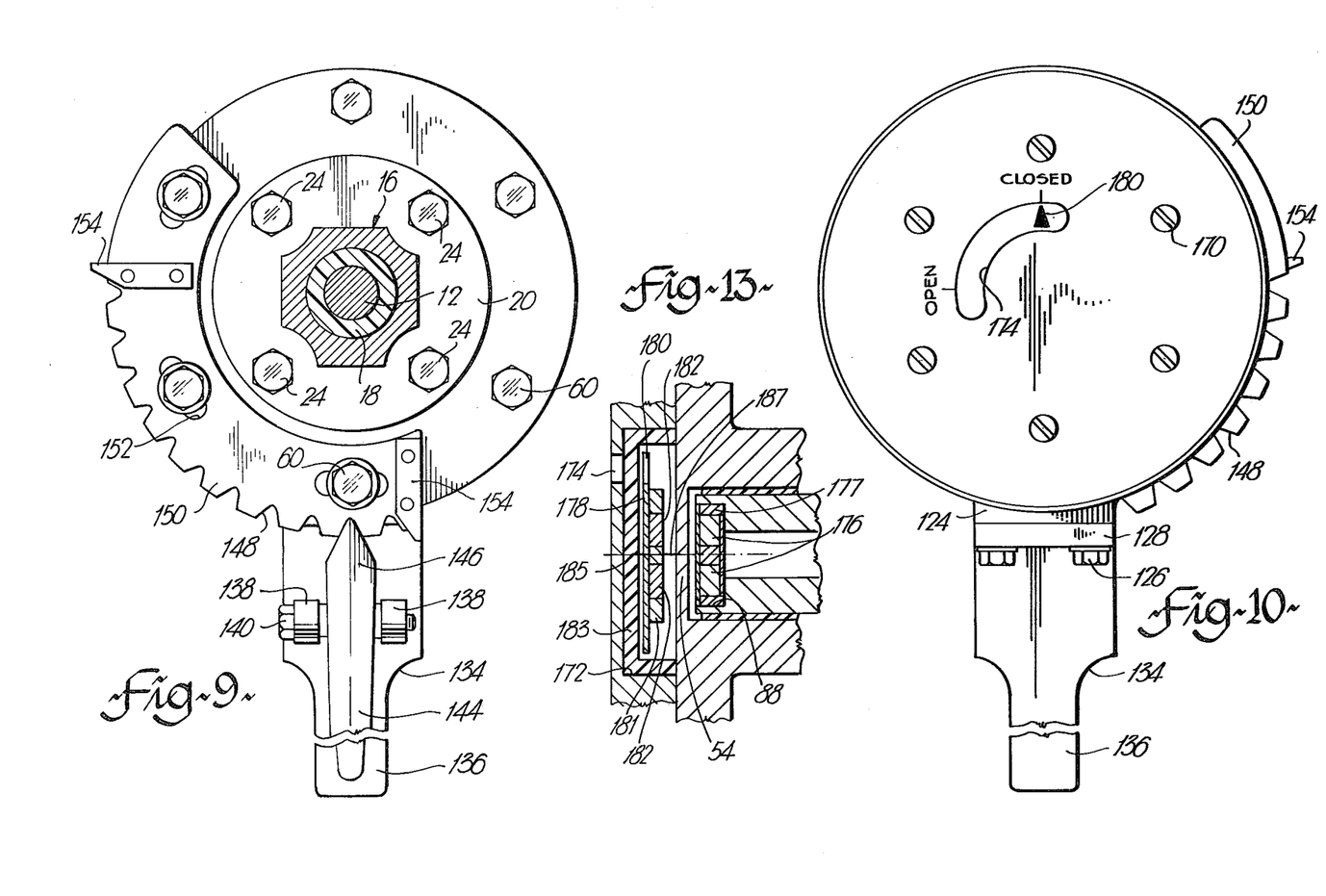
FIG. 9 is a right end view of the general assembly of FIG. 1.
FIG. 10 is a left end view of the general assembly of FIG. 1.
FIG. 13, appearing on the same sheet as FIG. 1, is an enlarged sectional view of the left land end of the general assembly of FIG. 1 showing the indicator mechanism.

A plate 124 is welded to the outer surface of armature 108 and has affixed thereto as by bolts 126 the shorter leg 128 of an L-shaped handle member 130. As seen in FIGS. 1, 9 and 10 the longer leg 132 of handle member is necked down as at 134 to define a narrower handle portion 136. A pair of bearing blocks 138 welded to handle member 130 support a pivot pin which may be a bolt 140. Pivot pin 140 in turn supports a locking member 142 having a gripping portion 144 and a pointed ratchet end 146. Ratchet end 146 is engagable with a selected one of ratchet teeth 148 provided in a sector plate 150 affixed to base 22 by a plurality of the bolts 60 (FIG. 9). The mounting apertures extending through plate 150 are in the form of arcuate slots 152 to permit limited angular adjustment of plate 150 on base 22. Stop members 154 are affixed to plate 150 so as to extend outwardly beyond teeth 148 to limit the angular movement of the locking member 142.

The gripping portion 144 of locking member 142 is biased away from handle member 130 as by a compression spring 156 but the bias is limited by a limit pin 158 affixed to handle member 130 on the side of bearing blocks 138 opposite compression spring 156. The height of pin 158 is such as to ensure engagement of ratchet end 146 with a selected tooth 148 in the normal position of the locking member as shown in FIG. 1.

Figure 11:
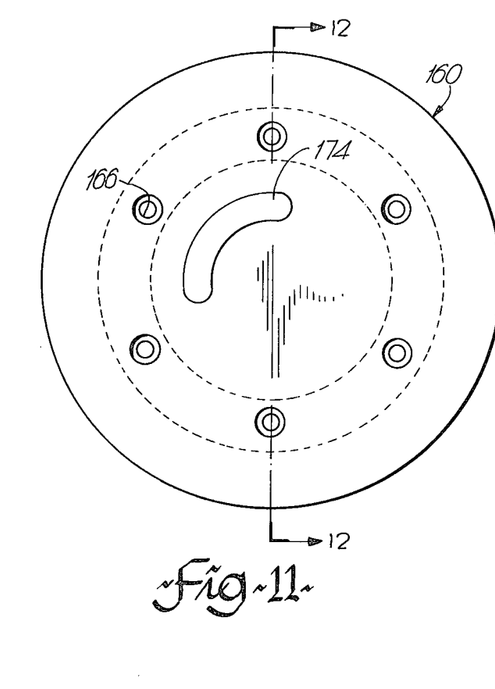
FIG. 11, appearing on the same sheet as FIG. 8, is a plan view of the cap member.
Figure 12:
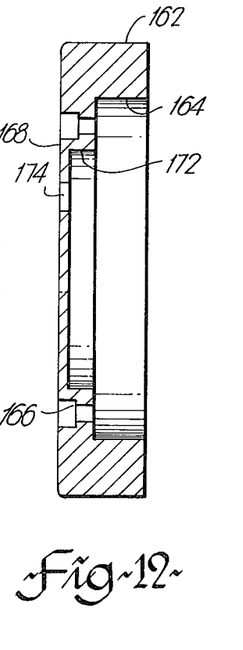
FIG. 12, appearing on the same sheet as FIG. 8, is a section of the cap member taken along the line 12—12 of FIG. 11.

FIGS. 1, 11 and 12 illustrate a cap member 160 which fits on the end of the separator member 50. Cap member 160 includes cylindrical side wall 162 having an internal blind bore 164 sized to receive the end wall 54 of the separator member 50. The outer diameter of wall 162 is the same as the outer diameter of the driver magnet assembly. A plurality of spaced countersunk bores 166 in the end wall 168 of the cap member receive cap screws 170 for mating threaded engagement with the threaded bores 64 in the end wall 54 of separator member 50 to secure the cap member to the separator member. A circular recess 172 is provided in the inner surface of end wall 168 communicating with the blind bore 164 and an arcuate slot 174 is provided in the end wall 168 communicating with the recess 172. Slot 174 spans an arc slightly greater than 90° and when the cap member is secured to the separator member slot 174 will be aligned arcuately with groove 48 in base member 22. Cap member 160 is preferably formed from type 316 stainless steel.

Slot 174 is utilized as part of an indicator mechanism to show the position of carrier member 70 and valve stem 12, the indicator mechanism operating without any mechanical interconnection with the carrier member 70. This is achieved by fixing a pair of disc magnets 176 in the recess 88 formed in the end of carrier member shaft portion 74 opposite slot 86. The disc magnets 176 are positioned in a stainless steel cup 177 which fits in recess 88 so that the magnets are separated by the axis of the carrier member. A stainless steel cap is welded to the carrier shaft portion 74 about its periphery to enclose the disc magnets 176. (See FIG. 13). A disc-shaped member 178 having a small pointer 180 extending from the outer edge thereof is rotatably mounted in recess 172 so as to pivot about the axis of the cap member 160. As shown in FIG. 10 pointer 180 is visible through slot 174. Referring to FIG. 13, a pair of disc magnets 182 is affixed to indicator 178 as in stainless steel housing 181 so that they will couple magnetically through the end wall 54 of the separator member with the disc magnets 176 so that rotation of the carrier member 70 and disc magnets 176 will result in rotation of indicator 178. A clear plastic cup member 183 positioned in recess 172 has the indicator 178 and magnet housing 181 mounted therein as on pivot pin 185. A pivot pin 187 extends from the magnet housing 181 for reception in an appropriate bore in the end wall 54 of separator member 50. Thus the indicator assembly will pivot on the pins 185, 187 on the central axis of the cap member and the carrier member. Cap member 160 may carry suitable indicia thereon adjacent slot 174 to define the relative position of carrier member 70 and valve stem 12. The indicia may be the words "OPEN" and "CLOSED" to indicate the state of the valve member attached to the valve stem 12.

The torque transmitter is assembled as shown in FIGS. 1, 9 and 10. Base member 22 is bolted to the flange 20 with O-ring seal 34 in place and then the carrier member 70 is located therein, separated from the base by a TEFLON ® bushing 190 and ROULON ® thrust washer 192. Slot 86 is keyed to valve stem 12 and oriented so that pin 92 is received in arcuate slot 48. The separator member 50 is positioned over the carrier member and is bolted to the flange portion of the base 22 as by bolts 60. Carrier member 70 is separated from the separator member by a TEFLON ® bushing 194 and a ROULON ® thrust washer 196. A stainless steel thrust washer 184 is slid over the outer surface of the separator member to abut against the flange 56. An appropriate plastic bearing washer 186 of a material such as ROULON ® is placed over the separator member to abut thrust washer 184 and then the driver magnet assembly is slid over the separator member so that a thrust ring 118 thereof abuts bearing washer 186 and ratchet end 146 of locking member 142 engages a tooth 148 of the sector plate 150.

A second bearing washer 188 is slid onto the separator member to abut the other thrust ring 118 and then the cap member 160 is secured to the separator member to hold the driver magnet assembly in place.

The driver magnet assembly is used to position the valve member in its desired orientation. On initial assembly the magnetic forces generated between the driver magnets 112 and the carrier or driven magnets 98 will effectively induce a torque which causes the carrier member and the valve stem attached thereto to rotate until the magnets thereof are aligned with the appropriate magnets of opposite polarity in the driver magnet assembly. The final resting position of the carrier member, valve stem and valve member is ascertained by observing the indicator pointer 180 in slot 174 since rotation of disc magnets 176 will result in a magnetically coupled rotation of indicator magnets 182 and the indicator disc 178 attached thereto.

To adjust the rotational position of the valve member the handle assembly is gripped and the gripping portion 144 of locking member 142 is pulled inwardly towards handle portion 132. This movement pivots the locking member about the pivot pin 140 so as to rotate ratchet end 146 out of engagement with the ratchet tooth 148. It is then possible to rotate the driver magnet assembly clockwise or counterclockwise via the handle assembly, the interaction between the driver magnets 112 and the driven magnets 98 causing the carrier member to follow the rotation of the driver magnet assembly until the desired orientation of the valve member is achieved, as observed in the indicator mechanism. The locking member may then be released so that compression spring 156 forces the locking member to rotate to bring the ratchet portion 146 into engagement with another ratchet tooth 148.

The pin 92 and the mating groove 48 as found in the carrier member and the base member respectively act together as a torque arrestor. As previously indicated groove 48 has an arcuate extent slightly greater than 90° with the 0° position corresponding to the valve open position. The limit stops 154 also generally correspond to the end positions of the groove 48. When the driver magnet assembly is moved to a position corresponding to the open position of the valve the torsional friction forces acting on the driven magnet assembly are very slight and there will be little or no tangential component to the flux lines extending between adjacent driven and driver magnets. When the handle assembly is moved towards the closed position of the valve member the coupling flux lines will have a tangential component resulting in the following rotational movement of the carrier member. When the valve is completely closed, with the handle assembly locked adjacent the limit stop 154 the pin 92 will be abutting against the appropriate end of the groove 48. The relationship between the angular position of the closed position of the handle assembly and the corresponding end of the groove 48 is such that with the handle assembly and the carrier member in their "valve closed" positions there will still be a tangential component to the flux lines to effectively pre-load, or over bias, the valve member to its closed position.

The torque arrestor as described acts to: limit the travel of the carrier member (and hence of the valve member) relative to the driver magnet assembly; achieve the correct angle of rotation to completely close the valve, without over travel; and to achieve a preload or holding torque on the valve member when it is completely closed.

It is accordingly seen that the assembly of the present invention may be used with a valve member such as a butterfly valve, which is housed in a hostile environment without any direct mechanical contact between the valve actuator and the valve stem. The driven portion of the assembly, namely the carrier member, the carrier magnet assembly and the valve stem is hermetically sealed from the actuator portion, namely the driver magnet assembly. Even the position indicator operates without any mechanical interconnection with the driven portion of the assembly.

The foregoing disclosure is intended to describe the best mode of putting the present invention into effect. Clearly, alterations in the structure of the invention could be effected by a person skilled in the art without departing from the spirit thereof. For example the present invention need not be used exclusively with a butterfly valve. Any valve requiring rotary motion could be controlled via the present invention. Also it would be possible to use different magnet configurations or quantities in the driven and driver magnet assemblies. Accordingly the protection to be afforded the present invention is to be determined from the appended claims.

The embodiments of the invention in which an exclusive property or privilege is claimed are defined as follows:

1. An hermetically sealed torque transmitting assembly for effecting rotation of a valve member contained within a valve body and having a valve stem extending from the valve body, comprising:
   a generally cylindrical housing defining a central axis and having a base through which the valve stem may extend, a cylindrical housing wall portion and an end cap, said housing wall portion being rotatable about said axis;
   a generally cylindrical carrier member within said housing, said carrier member being connectable at one end thereof to the valve stem and being rotatable about said axis;
   a first plurality of circumferentially spaced permanent magnet elements mounted in said carrier member so as to face said housing wall portion, circumferentially adjacent magnet elements having opposite polarity;
   a second plurality of circumferentially spaced permanent magnet elements mounted in said housing wall portion to face the magnet elements in said carrier member, circumferentially adjacent magnet elements of said second plurality being of opposite polarity;
   and a generally magnetically inert separator member sealed to said base so as to completely enclose said carrier member, said separator member having a wall portion positioned between said first plurality of magnet elements and said second plurality of magnet elements; and
   torque arrestor means coupled to said carrier member and said base for limiting relative rotational movement thereof between predetermined angular limits;
   whereby rotation of said housing wall portion results in magnetically induced rotation of said carrier member with rotation of said carrier member limited by said torque arrestor means.

2. The assembly of claim 1, wherein said torque arrestor means comprises a pin projecting from one of said carrier member and said base parallel to said axis, and an arcuate groove with closed ends defining said predetermined angular limits in the other of said carrier member and said base.

3. The assembly of claim 2, wherein said pin extends from one end face of said carrier member toward said base, and said groove is in said base.

4. The assembly of claim 1, wherein said body is sealingly fixed to a flanged coupling for bearingly carrying the valve stem on said axis.

5. The assembly of claim 4, wherein said carrier member includes a shaft portion keyable at said one end thereof to the valve stem, a flange portion directed radially from said shaft portion, an outer cylindrical wall portion connected to said flange portion, an annular mild steel armature member mounted to the outer surface of said carrier member wall portion, and a plurality of circumferentially spaced axially directed slots, each said slot containing one of said first plurality of permanent magnet elements.

6. The assembly of claim 5, wherein each of said first plurality of magnet elements includes three individual magnets of like polarity.

7. The assembly of claim 4, wherein a magnetically inert sleeve member circumferentially surrounds said carrier member in close juxtaposition to said first plurality of magnet elements.

8. The assembly of claim 5, wherein said housing wall portion includes an annular mild steel armature section, a plurality of circumferentially spaced axially directed slots, each said slot containing one of said second plurality of magnet elements, an inner magnetically inert sleeve member adjacent said second plurality of magnet elements, and an annular thrust ring at each end of said armature extending radially inwardly to cover the axial ends of said inner sleeve and said second plurality of magnet elements.

9. The assembly of claim 8, wherein each of said second plurality of magnet elements includes three individual magnets of like polarity.

10. The assembly of claim 8, wherein said housing wall portion has rotating means for effecting rotation thereof, said rotating means including a sector plate affixed to said base and having a plurality of adjacent ratchet teeth extending radially therefrom, a handle affixed to said housing wall portion, and a locking member pivotally attached to said handle; and said locking member has a ratchet end engagable with a selected one of said ratchet teeth, a gripper portion and means between said handle and said gripper portion for biasing said ratchet end towards a position of engagement with a ratchet tooth of said sector plate.

11. The assembly of claim 8, wherein said separator member has a flange portion at one end affixed to said base and an end wall at the other end, said end cap being secured to said end wall, said end cap having a cylindrical wall serving to retain said housing wall portion in position between said base and said end cap.

12. The assembly of claim 11, wherein said end cap has an axially directed recess therein containing a magnetic indicator assembly for indicating the rotational position of said carrier member.

13. The assembly of claim 12, wherein said indicator assembly includes a pair of disc magnets located in one end of said carrier member adjacent the end wall of said separator member, a cup-shaped clear plastic member located in said recess in said end cap and an indicator member including an indicator disc having a pointer thereon and a housing containing a pair of disc magnets alignable with the disc magnets in said carrier member, said indicator member being rotatable on said axis between said plastic member and the end wall of said separator member, said cap member having a slot therethrough for viewing said pointer.

14. A hermetically sealed torque transmitting assembly for effecting rotation of a valve member contained within a valve body and having a valve stem extending from the valve body, comprising:
a generaly cylindrical base member sealingly connectable to the valve body and having a central bore to receive the valve stem;
a carrier member having a shaft portion with one end thereof bearingly received in said bore and keyable to said valve stem, a radially directed flange portion, and an outer cylindrical wall portion;
torque arrestor means including a pin mounted in said flange portion of said carrier member and projecting therefrom and an arcuate groove contained in an internal radial face of said base member receiving said pin;
an annular drive armature surrounding said wall portion and including a first plurality of circumferentially spaced rare earth magnetic elements in an outer surface thereof, circumferentially adjacent magnetic elements having opposite polarity;
a cylindrical separator member sealingly connected to said base member and having a cylindrical wall portion surrounding said first plurality of magnetic elements and an end wall portion having a central bore for bearingly receiving the other end of said carrier member shaft portion;
a rotatable driver magnetic assembly surrounding said wall portion of said separator member and including an annular driver armature, a second plurality of circumferentially spaced rare earth magnetic elements mounted in an inner peripheral surface of said annular driver armature, circumferentially adjacent magnetic elements having opposite polarity, the magnetic elements of said second plurality facing the magnetic elements of the first plurality;
means for effecting rotation of said driver magnet assembly;
an end cap affixed to said end wall portion of said separator member, said end cap having a cylindrical wall serving to retain said driver magnet assembly in position between said base and said end cap; and
magnetic indicator means for indicating the rotational position of said carrier member, said indicator means including a pair of disc magnets located in the other end of said shaft portion of said carrier member adjacent the end wall of said separator member, a cup-shaped clear member located in a recess in said end cap and an indicator member including an indicator disc having a pointer thereon and a housing containing a pair of disc magnets alignable with the disc magnets in the carrier member, said indicator member being pivotal on said axis between said clear member and said end wall portion of said separator member, said end cap having a slot therein for viewing said pointer.

15. The assembly of claim 14, wherein said means for effecting rotation of said driver magnet assembly includes a sector plate affixed to said base member and having a plurality of adjacent ratchet teeth extending radially therefrom, a handle affixed to said annular driver armature, and a locking member pivotally attached to said handle; and said locking member has a ratchet end engageable with a selected one of said ratchet teeth, a gripper portion and means between said handle and said gripper portion for biasing said ratchet end towards a position of engagement with a ratchet tooth of said sector plate.

16. An hermetically sealed torque transmitting assembly for effecting rotation of a valve member contained within a valve body and having a valve stem extending from the valve body, comprising:
a generally cylindrical housing defining a central axis and having a base through which the valve stem may extend, a cylindrical wall portion and an end cap, said wall portion being rotatable about said axis;
a generally cylindrical carrier member within said housing, said carrier member being connectable at one end thereof to the valve stem and being rotatable about said axis;
a first plurality of circumferentially spaced permanent magnet elements mounted in said carrier member so as to face said housing wall portion, circumferentially adjacent magnet elements having opposite polarity;
a second plurality of circumferentially spaced permanent magnet elements mounted in said housing wall portion to face said first plurality of magnet elements in said carrier member, circumferentially adjacent magnet elements of said second plurality being of opposite polarity;
a generally magnetically inert separator member sealed to said base to completely enclose said carrier member, said separator member having a wall portion positioned between said first plurality of magnet elements and said second plurality of magnet elements and having an end wall parallel and adjacent to said end cap;

said end cap having an axially directed recess therein facing said end wall and containing a magnetic indicator assembly for indicating the rotational position of said carrier member; and said indicator assembly including a pair of disc magnets located in one end of said carrier member adjacent said end wall of said separator member, a cup-shaped clear plastic member located in said recess in said end cap and an indicator member including an indicator disc having a pointer thereon and a housing containing a pair of disc magnets alignable with the disc magnets in said carrier member, said indicator member being rotatable on said axis between said plastic member and the end wall of said separator member, said end cap having a slot therethrough for viewing said pointer;

whereby rotation of said housing wall portion results in magnetically induced rotation of said carrier member and the valve stem and valve member connected thereto.

17. The assembly of claim 16, wherein said body is sealingly affixed to a flanged coupling for bearingly carrying the valve stem on said axis.

18. The assembly of claim 17, wherein said carrier member includes a shaft portion keyable at said one end thereof to the valve stem, a flange portion directed radially from said shaft portion, an outer cylindrical wall portion connected to said flange portion, an annular mild steel armature member mounted to the outer surface of said carrier member wall portion, and containing a plurality of circumferentially spaced axially directed slots, each said slot containing one of said first plurality of permanent magnet elements.

19. The assembly of claim 18, wherein a torque arrestor pin is mounted in said flange portion and projects therefrom; and an arcuate groove is contained in an internal radial face of said base for receiving said torque arrestor pin.

20. The assembly of claim 18, wherein each of said first plurality of magnet elements includes three individual magnets of like polarity.

21. The assembly of claim 18, wherein a magnetically inert sleeve member circumferentially surrounds said carrier member in close juxtaposition to said first plurality of magnet elements.

22. The assembly of claim 18, wherein said housing wall portion includes an annular mild steel armature section, a plurality of circumferentially spaced axially directed slots therein, each said slot containing one of said second plurality of magnet elements, an inner magnetically inert sleve member adjacent said second plurality of magnet elements, and an annular thrust ring at each end of said armature extending radially inwardly to cover the axial ends of said inner sleeve and said second plurality of magnet elements.

23. The assembly of claim 22, wherein each of said second plurality of magnet elements includes three individual magnets of like polarity.

24. The assembly of claim 22, wherein said housing wall portion has rotating means for effecting rotation thereof, said rotating means including a sector plate affixed to said base and having a plurality of adjacent ratchet teeth extending radially therefrom, a handle affixed to said housing wall portion, and a locking member pivotally attached to said handle; and said locking member has a ratchet end engagable with a selected one of said ratchet teeth, a gripper portion and means between said handle and said gripper portion for biasing said ratchet end towards a position of engagement with a ratchet tooth of said sector plate.

25. The assembly of claim 22, wherein said separator member has a flange portion at the end opposite said end walls, said flange portion being affixed to said base; said end cap is secured to said end wall; and said end cap has a cylindrical wall serving to retain said housing wall portion in position between said base and said end cap.

* * * * *